(12) United States Patent
Kobayashi et al.

(10) Patent No.: US 6,565,032 B1
(45) Date of Patent: May 20, 2003

(54) WINDING METHOD AND APPARATUS OF ARMATURE

(75) Inventors: Kaoru Kobayashi, Yamada-gun (JP); Kenichi Kanda, Kiryu (JP); Kazuo Arai, Isesaki (JP)

(73) Assignee: Mitsuba Corporation, Gumma (JP)

( * ) Notice: Subject to any disclaimer, the term of this patent is extended or adjusted under 35 U.S.C. 154(b) by 0 days.

(21) Appl. No.: 09/914,930

(22) PCT Filed: Mar. 8, 2000

(86) PCT No.: PCT/JP00/01396
§ 371 (c)(1),
(2), (4) Date: Sep. 5, 2001

(87) PCT Pub. No.: WO00/54395
PCT Pub. Date: Sep. 14, 2000

(30) Foreign Application Priority Data

Mar. 9, 1999 (JP) .............................................. 11/62283
Mar. 9, 1999 (JP) .............................................. 11/62284

(51) Int. Cl.[7] .............................................. H02K 15/09
(52) U.S. Cl. ..................... 242/433.3; 29/596
(58) Field of Search ............................. 242/433, 433.3, 242/439.1, 444; 29/596, 605

(56) References Cited

U.S. PATENT DOCUMENTS 2,714,174 A * 7/1955 Applegate ................... 310/265
4,563,606 A * 1/1986 Fukasawa et al. ........... 310/208
5,267,699 A * 12/1993 Lombarbi ................ 242/433.3
5,639,044 A * 6/1997 Cardini et al. ........... 242/433.1

FOREIGN PATENT DOCUMENTS

| JP | 58-144561 | 8/1983 | .......... H02K/15/09 |
| JP | 58-195455 | 11/1983 | .......... H02K/15/09 |
| JP | 64-39248 | 2/1989 | .......... H02K/15/09 |
| JP | 3-124246 | 5/1991 | .......... H02K/15/09 |
| JP | 8-504078 | 4/1996 | ............ H02K/3/46 |
| JP | 9-215238 | 8/1997 | ............ H02K/3/04 |
| JP | 9-322491 | 12/1997 | ......... H02K/15/085 |
| JP | 11-32456 | 2/1999 | ............ H02K/3/12 |

* cited by examiner

Primary Examiner—Emmanuel Marcelo
(74) Attorney, Agent, or Firm—McCormick, Paulding & Huber LLP

(57) ABSTRACT

A wire is wound in a plurality of core slots 15 on an armature core, and thereby a plurality of coils 18 is formed. In the case.where each coil end portion of the coils is formed in a predetermined shape by a shaping-winding method, a coil end portion of a coil wound in each core slot is formed to be close to an end surface of the armature core 12 as it is directed outside of a radius direction of the shaft 11. In the case where coil end portions are formed by a shaping-winding and direct-winding methods, some of coil end portions are formed between the first winding to the predetermined number-th winding coils by a shaping winding method, and the remaining coil end portions are formed between the predetermined number-th winding and the last winding coils by a direct-winding method.

6 Claims, 9 Drawing Sheets

WINDING METHOD AND APPARATUS OF ARMATURE

TECHNICAL FIELD

The present invention relates to a winding technique of winding wires on an armature that is provided at a rotor of an electric motor.

BACKGROUND ART

Among electric motors, one has a rotor unit and a stator. The rotor unit is formed by providing an armature core and a commutator on a shaft. A permanent magnet is provided on the stator. An armature has the armature core that is shaped like a column as a whole. A plurality of core slots extending in a radial direction in this armature core are each formed so as to penetrate from one end to the other of the armature core. A coil is formed by winding a wire in each core slot.

In the case where the wire for forming a coil is thin in diameter, a flyer winding machine as disclosed in Japanese Patent Laid-open No. 2-74141 can wind a core in each core slot by rotating a pair of arms. However, if the flyer winding machine is to form an armature core on which the thick wire in diameter is wound, since the wire is twisted and the armature core is deformed due to tension of the wire, it is difficult for the flyer winding machine to wind the thick coil in diameter.

In order to form a coil by using a thick wire in diameter, such a winding machine has been used that a wire is drawn out from a nozzle which is also called a capillary tube and which has the number corresponding to the number of core slots, and each nozzle reciprocates in an axial direction of the rotator unit to wind the coil in each core slot. This machine is also called a capillary type and is disclosed in, for example, Japanese Patent Laid-open No. 64-39248.

A pair of coils has straight portions and coil end portions. Each straight portion extends in an axial direction in two core slots between which the predetermined number of core slots is provided. The coil end portions are arranged along these straight portions and are also called crossover portions. Each one end of the pair of coils is installed at a predetermined engagement groove in the commutator, and the other end is installed at an engagement groove in a location spaced a predetermined pitch from the engagement groove at which the one end is installed.

In methods of forming the coil end portions by the capillary type winding machine, there are such a shaping-winding method as to form the coil end portions like a mountain shape or a square shape and such a direct-winding method as to form the coil end portions by directly winding a wire folded back.

The direct-winding method has no step of forming the coil end portions, so that it has an advantage over reduction of time required for winding the wire in comparison with the shaping-winding method. However, in this method, since crossover portions to be formed as coil end portions are piled up at an end surface of the armature, the number of coils wound in coil slots can not be increased. Therefore, even if a sectional area of the coil slot have a space enough to enter the coils, the number of coils is restricted.

Over against this, the shaping-winding method has can increase the winding number of coils inserted into the coil slot and improve an occupancy rate of the coils therein by isolating the coil end portions from the end surface of the armature core. However, in this method, a forming step is required and time for winding is required in comparison with the direct-winding method, so that efficiency of manufacture is decreased.

On the other hand, in the case where a capillary type winding machine draws out the wire from each nozzle to each core slot and simultaneously winds the wire even if either the shaping-winding or the direct-winding method is used, an overlap shape of the coil end portions becomes a twist shape. Therefore, such a dimension increases as to project from both end surfaces located in an axial direction of the armature core in a coil terminal portion formed by all the coil end portions. Even if each sectional area of the core slot is enlarged to increase the winding number of coils, the winding number is restricted by the projection dimension of the coil terminal portion. And, even if each core slot has a occupancy rate enough for each cross-section of the coils occupied therein, the winding number of coils can not be increased.

Further, if each shape of the coil end portions becomes twisted, it is impossible to use effectively a winding space of the end surface of the armature core in the case where a shaft has a thin radius because the minimum winding radius is determined by overlaps of the coil end portions.

An object of the present invention is to provide a winding method of an armature, which can manufacture efficiently the armature even if the winding number of coils wound in core slots is increased.

Another object of the invention is to provide a winding method of an armature, which can manufacture the armature in which a projecting dimension of each coil end portion formed at an end surface of an armature core is small even if the winding number of coils wound in core slots is increased.

Still another object of the invention is to provide a winding apparatus of an armature core, which can form coil end portions even if either a shaping-winding or direct-winding method is used.

DISCLOSURE OF THE INVENTION

According to a winding method of an armature that is the present invention, a winding method of an armature winding a coil by drawing out a wire from a plurality of nozzles, on an armature core which is provided on a shaft and on which a plurality of core slots extend in an axial direction thereof and is radiately formed, said winding method comprises the steps of: moving each of said nozzles from one end side of said armature core to the other end side, and inserting the wire into a first core slot; moving each of said nozzles from the other end side of said armature back to the one end side, and inserting the wire into a second core slot different from said first core slot; forming a coil end portion by bending a crossover portion which is formed in both sides of an end surface of said armature core and connects each wire existing in said first and second core slots; and making said nozzles close to said shaft, and thereby pressing said crossover portion on said shaft.

Further, according to a winding method of an armature that is the present invention, a winding method of an armature winding a coil by drawing out a wire from a plurality of nozzles, on an armature core which is provided on a shaft and on which a plurality of core slots extend in an axial direction thereof and is radiately formed, said winding method comprises the steps of: moving each of said nozzles from one end side of said armature core to the other end side, and inserting the wire into a first core slot; moving each of said nozzles from the other end side of said armature back to the one end side, and inserting the wire into a second core slot different from said first core slot; and forming a coil end portion by bending a crossover portion which is formed in both sides of an end surface of said armature core and connects each wire existing in said first and second core slots, wherein, in order to form a predetermined winding number of coils in said armature core, a plurality of coil end portions formed by repeating plural numbers each of said steps from a first time to a last time are closer to the end surface of said armature core as the number of times increases from the first time to the last time.

According to a winding method of an armature that is the present invention, a winding method of an armature winding a coil by drawing out a wire from a plurality of nozzles, on an armature core which is provided on a shaft and on which a plurality of core slots extend in an axial direction thereof and is radiately formed, said winding method comprises the steps of: moving each of said nozzles from one end side of said armature core to the other end side, and inserting the wire into a first core slot; moving each of said nozzles from the other end side of said armature back to the one end side, and inserting the wire into a second core slot different from said first core slot; and forming a coil end portion by bending a crossover portion which is formed in both sides of an end surface of said armature core and connects each wire existing in said first and second core slots, wherein said coil end portion is formed during formation of a first to a predetermined number-th coils, and the wire is directly inserted into said first and second core slots without forming said coil end portion after said predetermined number-th coil is formed. In the winding method of an armature that is the present invention, a winding method of an armature further comprises a step of pressing, to the shaft, said coil end portion formed by forming said predetermined number-th coil.

According to a winding apparatus of an armature that is the present invention, a winding apparatus of an armature winding a coil by drawing out a wire from a plurality of nozzles, on an armature core which is provided on a shaft and on which a plurality of core slots extend in an axial direction thereof and is radiately formed, said winding apparatus comprises: a first collet chuck located to have the same center as a rotary center axis of said shaft, and holding one end portion of said shaft; a second collet chuck located to have the same center as said first collet chuck, and holding the other end portion of said shaft; a nozzle supporting member on which said nozzles are provided movably toward said rotary center axis and which is capable of reciprocating relatively in a direction lying along said rotary center axis and rotating relatively around said rotary center axis as a rotary center; a first coil end shaping means having a shaping hook which is provided reciprocatably outside said first collet chuck in a direction lying along said rotary center axis and forms a coil end portion in a side of one end surface of said armature; and a second coil end shaping means having a shaping hook which is provided reciprocatably outside said second collet chuck in a direction lying along said rotary center axis and forms a coil end portion in a side of the other end surface of said armature, wherein a crossover portion is pressed on said shaft by making said nozzles close to said shaft, said crossover portion connecting the wire inserted into a first core slot by moving each of said nozzles from one end side of said armature core to the other end side and the wire inserted into a second core slot different from said first core slot by moving each of said nozzles from the other end side of said armature back to one end side. According to the winding apparatus of an armature that is the present invention, in order to form a predetermined winding number of coils on said armature core, a plurality of coil end portions formed by repeating plural numbers a reciprocation of said nozzles in a direction lying along said rotary center axis are closer to an end surface of said armature core as the forming number of the coil end potions.increases from a first time to a last time.

According to the present invention, coil end portions enter a step portion between an outer surface of a shaft and a bottom surface of each of core slots outside both end surfaces of an armature core, so that a space for winding coils at the end portion of the armature core can be effectively used. Further, each length of the coil end portions projecting from the end surface of the armature core gradually becomes short as each coil end portion moves from the vicinity of the shaft to the outside of a radius direction, so that the coil terminal portion formed by all the coil end portions can be miniaturized in size even if the winding number of coils is increased.

According to the present invention, a shaping-winding method for forming the coil end portions is operated between the first winding and the predetermined number-th winding. A direct-winding method for forming the coil end portions is operated between the predetermined number-th winding and the last winding. Therefore, in comparison with the case where all the coil end portions are formed by the shaping-winding method, it is possible to reduce time required for winding the coils and to improve efficiency for manufacturing the armature. Since the shaping-winding method is executed between the first winding and the predetermined number-th winding, it is possible to increase the winding numbers in each core slot without enlarging each coil end portion.

BEST MODE FOR CARRYING OUT THE INVENTION

An embodiment of the present invention will be described in detail, with reference to the accompanying drawings.

Figure 1A:
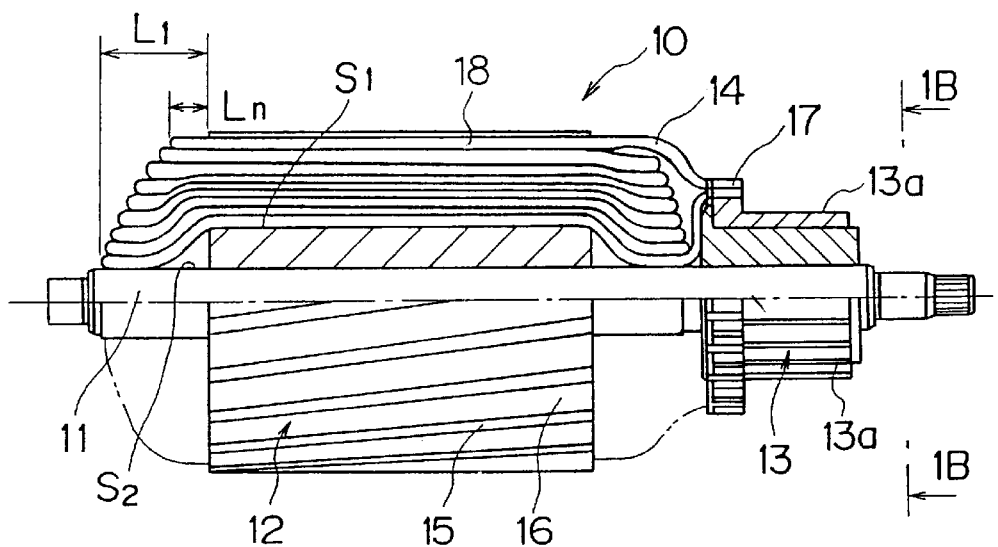
FIG. 1(A) is a semi cross-sectional view showing a rotor unit that has an armature core and a commutator.
Figure 1B:
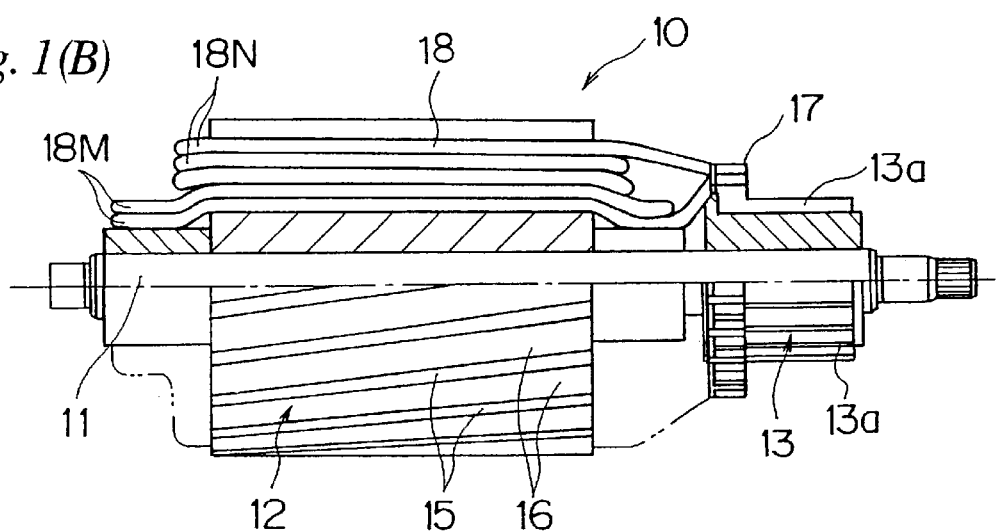
FIG. 1(B) is a semi cross-sectional view shown a rotor unit of another type.

A rotor unit of an electric motor shown in FIGS. 1(A) and 1(B) has a shaft 11, an armature core 12 provided on the shaft, and a commutator 13 provided on the shaft 11 to be isolated from the armature core in an axial direction thereof. Coils are wound on core slots of the armature core 12 by using a wire 14, and thereby a armature is formed. A rotor unit 10 illustrated in FIG. 1(B) has the same structure as the rotor unit 10 showing in FIG. 1(A). The wire 14 has a diameter of about 1 to 2 mm.

Figure 1C:
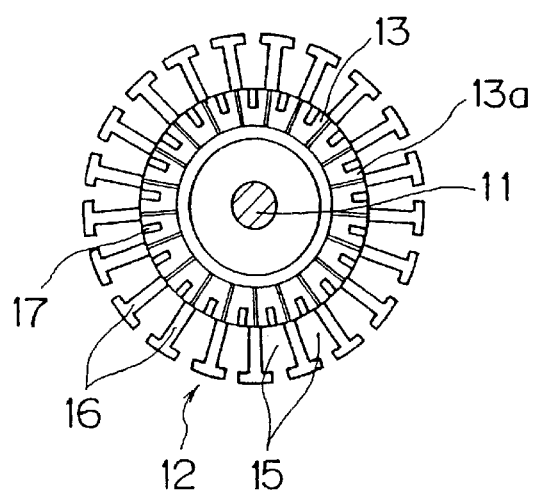
FIG. 1(C) is a cross-sectional view taken along line 1B—1B in FIG. 1(A).

FIG. 1(C) is a cross-sectional view taken along line 1B—1B under the condition that the wire 14 shown FIG. 1(A) is removed. The armature core 12 formed like a cylinder as a whole has twenty-one core slots 15 which extend radiately and which are opened in a radius direction. Each core slot 15 is formed to extend in an axial direction thereof and is penetrated between both end surfaces of the armature 12. Tooth portions, or core teeth 16 are provided between the core slots 15 adjacent to each other, respectively. Each of the core teeth 16 is provided with flange portions projecting from both sides of a circumferential direction at a tip end of a radius direction. Each section of the core teeth 16 is formed in a T shap. As shown in lower halves of FIGS. 1(A) and 1(B), the core slots 15 and the core teeth 16 incline slightly in the circumferential direction from one end thereof to the other end.

As illustrated in FIG. 1(C), the commutator 13 has twenty-one segments 13a to correspond to the number of core slots. Each segment 13a has a groove 17 formed for fixing both end portions of each of the coils 18.

Figure 2:
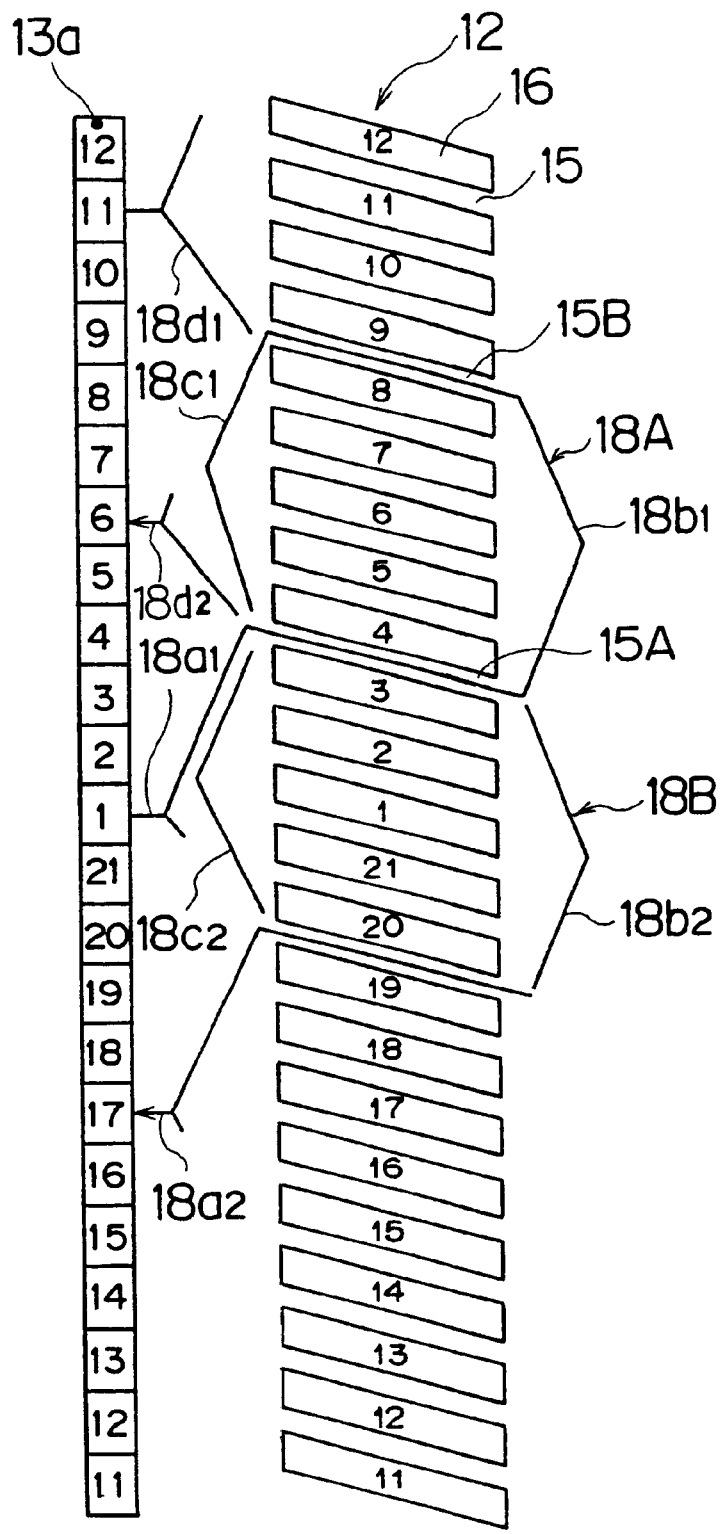
FIG. 2 is an expansionary view showing a connection state of coils wound on the armature core shown in FIGS. 1(A) to 1(C).

FIG. 2 is an expansionary view showing a connection state of two pair of coils formed by a first winding among the coils 18 which is formed by winding the wire 14 on the core slots 15 of the armature core 12. For example, a pair of coils 18A form one turn by connecting one end portion 18a1 thereof to the first segment, and by passing the core slot 15B between the eighth and ninth core teeth 16, through the coil end portion 18b1 of an opposite side of the commutator 13, from the core slot 15A between the third and fourth core teeth, and by returning the core slot 15A through the coil end portion 18c1 of a side of the commutator 13. The predetermined winding number of coils is wound, for example, the wire 14 is wound five or seven times, and thereby the coil 18A is formed by winding the winding number of wire 14. The other end portion 18d1 is connected to the eleventh segment.

In the core slot 15A for forming the coil 18A, the coil 18B is also wound. One end portion 18a2 of this coil 18B is connected to the seventeenth segment, and the other end portion 18d2 thereof is connected to the sixth segment. The coil end portions 18b2 and 18c2 are formed in both side of the armature core 12. Therefore, in the case where one pair of coils is formed by five windings, ten wires are inserted into the respective core slots 15. In the case where one pair of coils are formed, fourteen wires are inserted into respective core slots 15. Although the wires are simultaneously inserted into twenty-one core slots 15, coils other than two pairs of coils 18A and 18B are omitted in the case of FIG. 2.

Each of the coils 18 shown in FIG. 1(A) is formed by winding a wire 14 seven times around the armature core 12. The coil end portions are formed so that each coil end portion approaches an end surface of the armature core 12 as the winding number increases from the first winding to the seventh winding.

Each of the coils 18 shown in FIG. 1(B) is formed by winding a wire 14 five times around the armature core 12. The first and second windings form the coil ends, and the third, fourth and fifth windings are direct-wound without forming the coil ends.

Figure 3:
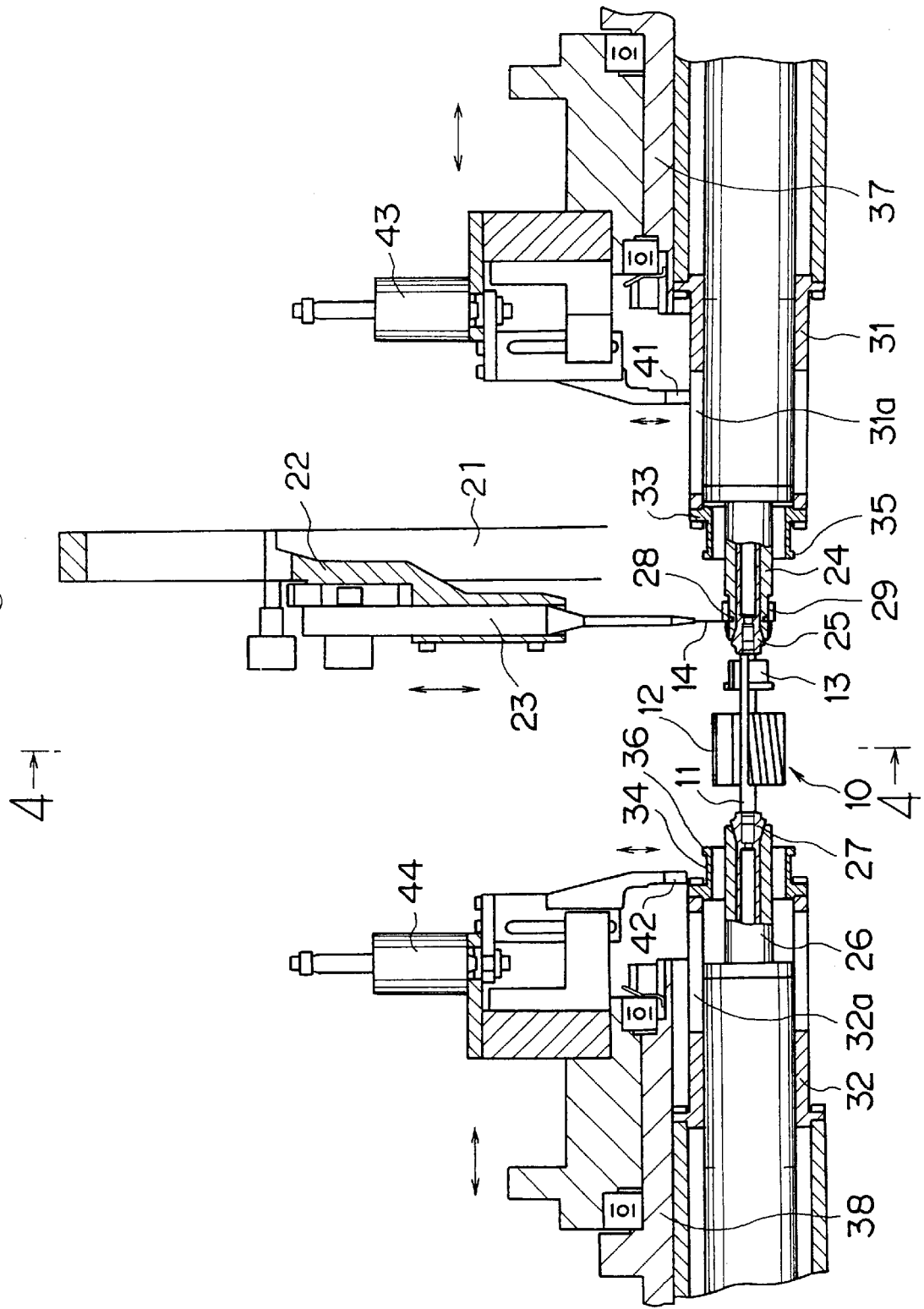
FIG. 3 is a longitudinal sectional view of a part of a winding machine winding a wire on the armature core shown in FIGS. 1(A) and 1(B).
Figure 4:
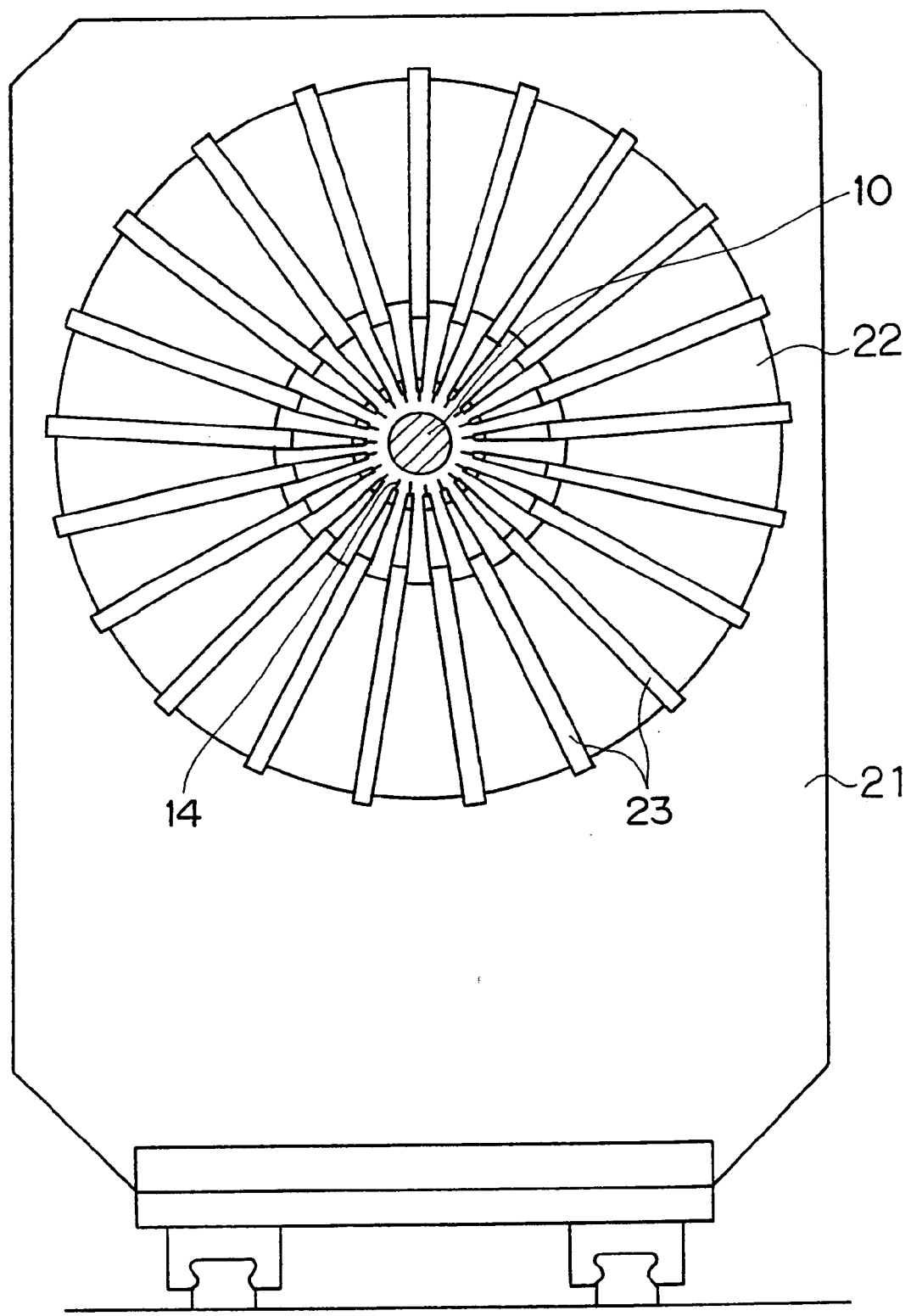
FIG. 4 is a cross-sectional view of the winding machine taken along line 4—4 in FIG. 3.

A winding machine for winding the coils 18 on the armature core 12 shown in FIGS. 1(A) and 1(B) by using the wire is shown in FIGS. 3 and 4. FIG. 3 shows one of the twenty-one nozzles 23 shown in FIG. 4. The nozzles have the same structure.

As shown in FIG. 4, on a nozzle supporting member 22 which is formed like a circular shape and is rotatable about a rotational center axis of horizontal direction as a center and is fixed to a supporting stand 21, the twenty-one nozzle 21 spaced in a circumferential direction are radiately provided to correspond to the twenty-one core slots 12 formed on the armature core 12. Through each nozzle 23, the wire 14 is fed to the armature core 12. As shown in FIG. 3, this nozzle supporting member 22 can reciprocate in left and right directions, or in horizontal direction. When the nozzle supporting member 22 moves forward in the left direction, the nozzles 23 move forward in the horizontal direction. When the nozzle supporting member 22 moves backward to the right direction, the nozzles 23 move backward to a returning direction. Each nozzle 23 can move backward and forward relative to a rotational center axis of the nozzle supporting member 22. As moving forward, each nozzle 23 approaches the rotational center axis. As moving backward, each nozzle 23 is apart from the rotational center axis.

As is shown in FIG. 3, in order to hold one end portion of a side of the commutator 13 in a shaft 11 as corresponding to the rotational center axis of the nozzle supporting member 22, a collet chuck 25 is installed in the a drive shaft 24 which is provided at the supporting stand 21 and relatively moved relative to the supporting stand 21. A drive shaft 26 facing the drive shaft 24 and having the same axle as the drive shaft 24 is provided at a not shown supporting stand located as facing the supporting stand 21. In order to hold one end portion of a side of the armature in the shaft 11, a collet chuck 27 is installed in this drive shaft 26. Each of the collet chucks 25 and 27 can reciprocate in each axial direction together with each drive shaft 24 and 26. With these collet chucks 25 and 27 isolated only a predetermined distance from each other, after a transport apparatus not shown locates the rotary unit 10 between the collet chucks 25 and 27, the rotary unit 10 is supported at both end portions of the shaft 11 by closing these.

Both drive shafts 24 and 26 can rotate along with the collet chucks 25 and 27, so that the rotor unit 10 can be rotated.

On an outer side of the drive shaft 24, an annular concave portion 28 is formed which supports a tip portion of the wire 14. In order to be fixed with the tip portion of the wire 14 inserted into this concave portion 28, an annular fixing ring 29 capable of reciprocating in an axial direction is installed on an outer side of the drive shaft 24.

On the outer side of the drive shaft 24, a drive sleeve 31 movable in an axial direction is installed. Similarly, on the outside of the drive shaft 26, a drive sleeve 32 movable in an axial direction is installed. To drive sleeves 31 and 32, shaping cylinders 33 and 34 are attached as coil end shaping means, respectively. On the shaping cylinder 33 and 34, respective twenty-one shaping hooks 34 and 36 for shaping the coil end portion are provided to correspond to the number of nozzle 23 and to project outside of a radius direction. The drive sleeve 31 moves back and forth between such a forward position that the shaping cylinder 33 is located outside the armature 12 and such a backward position that the collet chuck 25 is exposed. The drive sleeve 32 moves back and forth between such a forward position that the shaping cylinder 34 is located outside the armature 12 and such a backward position that the collet chuck 27 is exposed.

Outside the drive sleeves 31 and 32, reciprocative sliders 37 and 38 reciprocating in an axial direction is installed, respectively. On the reciprocative sliders 37 and 38, respective twenty-one press clamps 41 and 42 moveable in a radius direction to each central axis of the drive shafts 24 and 26 are provided to correspond to the number of nozzle 23. In order to make the respective press clamps 41 and 42 move back and forth in the radius direction, hydropneumatic cylinders 43 and 44 are installed in the reciprocative sliders 37 and 38, respectively.

With the reciprocative slider 37 moving forth until the nozzle 23 arrives at a right side of the shaft 11 of the armature core 12 as shown in the drawing, if the press clamp 41 moves forth, the wire 14 is pressed to the shaft 11. When the press clamp 41 is moved forth with the drive sleeve 31 moving forth, an opening portion 31a is formed in the drive sleeve 31 in order to avoid interference between the drive sleeve 31 and the press clamp 41. Similarly, an opening portion 32a is also formed in the drive sleeve 32.

Next, a winding method for winding the coils 18 around the armature core 12 by using the wire 14 will be explained, with reference to FIGS. 5 to 9.

First, under the condition that the drive shaft 24 and the collet chuck 25 are spaced only a predetermined distance and that the drive shaft 26 and the collet chuck 27 are also spaced only a predetermined distance, the transport apparatus not shown transports the rotor unit 10 shown in FIG. 1 between the collet chucks 25 and 27. Under this condition, the collet chucks 25 and 27 hold both end portions of the rotor unit 10 to keep the rotor unit 10 supported in a horizontal state.

Under the condition that the nozzle supporting member 22 is positioned in an axial direction so that a front side of each of the nozzles 23 may correspond to a position of the concave portion 28 formed in the drive shaft 24, the wire 14 is drawn out from each tip of the nozzles 23 and the tip of the wire 14 is entered into the concave portion 28. Thereafter, the tip of the wire 14 is clamped in an outer circumferential portion of the drive shaft 24 by moving the fixing ring 29.

A condition where clamping the tip of the wire 14 is completed is shown in FIG. 3. Under this condition, each of the nozzles 23 is located at a position of each of the segments 13a of the commutator 13. Hence, when the nozzle supporting member 22 is moved to a left side shown in FIG. 5(A), the wire 14 is drawn out from each nozzle 23 and entered into each engagement groove 17 of the twenty-one segments 13a and the tip of the wire 14 is fixed at a predetermined position of the commutator 13. For example, the nozzle 23 for corresponding to the first segment 13a and for winding the coil 18A as shown in FIG. 2 is moved forth by this nozzle supporting member 22 and is fixed in the engagement groove 17 of the first segment 13a.

Figure 5A:
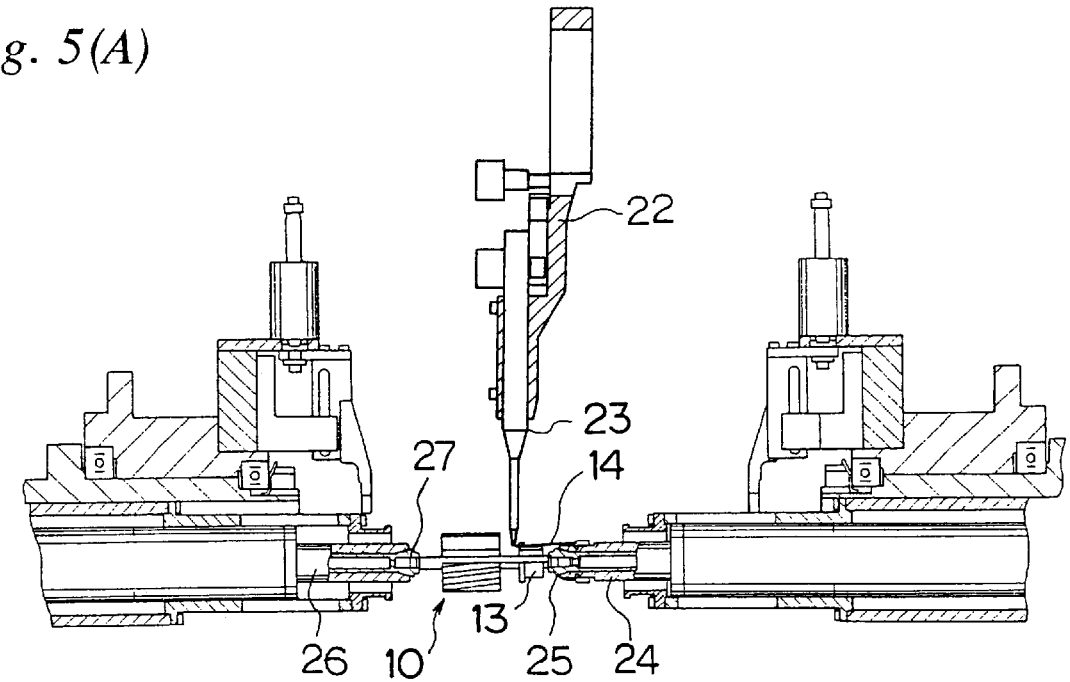
FIG. 5(A) is a cross-sectional view showing a condition where a tip portion of the wire is fixed on a segment of a commutator.
Figure 5B:
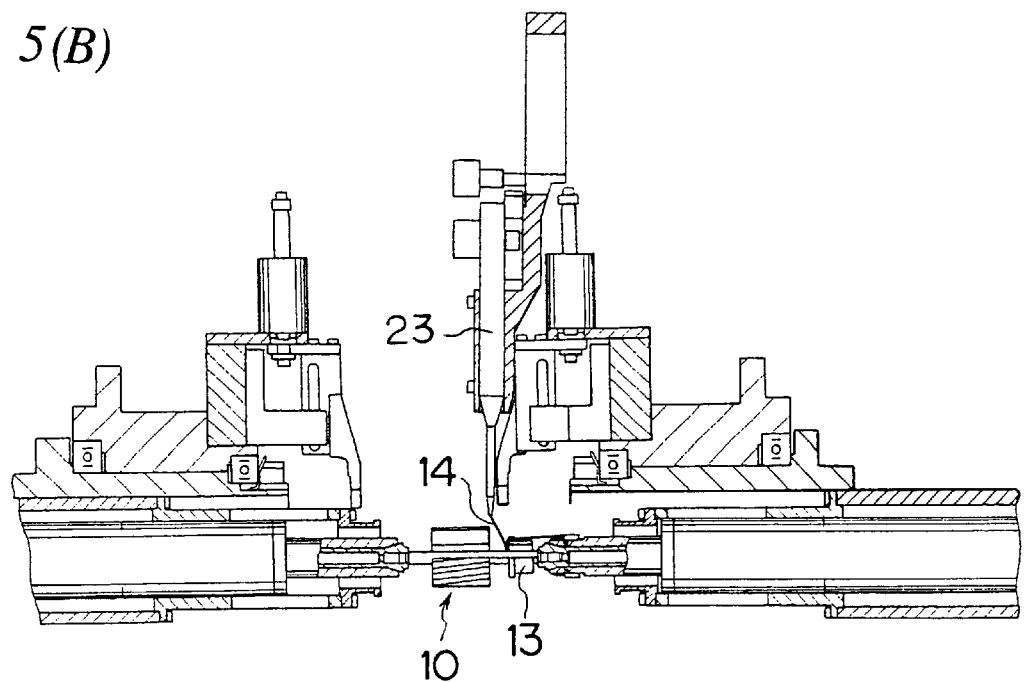
FIG. 5(B) is a cross-sectional view showing a condition where a nozzle is closed and thereafter is retreated.

As shown FIG. 5(A), after the tip of the wire 14 is fixed in each of the segments 13a of the commutator 13, since each nozzle 23 is moved forth toward the shaft 11, the wire 14 is bent so as to press the outer circumferential surface of the shaft 11. Thereafter, as shown in FIG. 5(B), each nozzle 23 is moved backward in a radius direction up to a position of a predetermined core slot 15 on which the wire 14 is wound. Since the nozzle supporting member 22 is rotated, each nozzle 23 is rotated in a circumferential direction. For example, the nozzle 23 for winding the coil 18A shown in FIG. 2 is rotated and moved up to a position of the core slot 15A between the third and fourth core teeth 16.

Figure 6A:
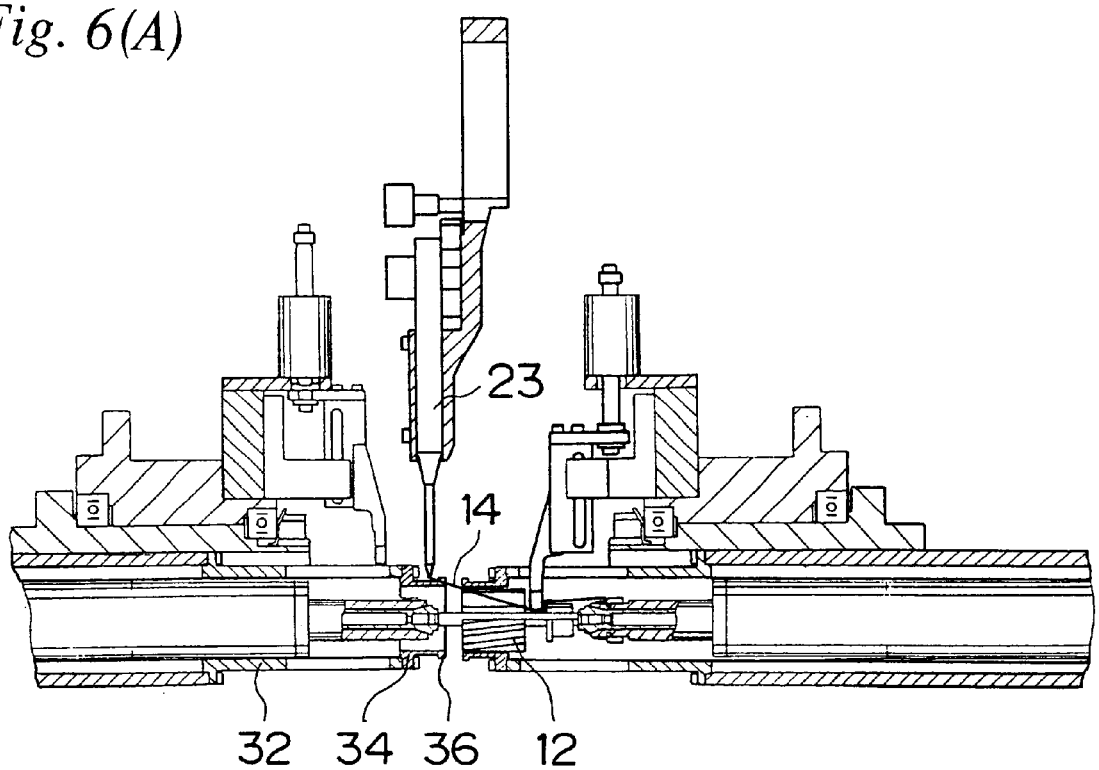
FIG. 6(A) is a cross-sectional view showing a condition where a wire is inserted into a core slot under the condition that the wire is clamped between a clamp and a shaft.

Under this condition, as shown in FIG. 6(A), the clamp 41 are moved forth toward the shaft 11 and the wire 14 is clamped between the press clamp 41 and the outer circumference surface of the shaft 11. By this means, with the wire 14 clamped, since each nozzle 23 is further moved forth in a left side shown in the drawing, the wire 14 is drawn out along an opening portion located outside a radius direction of each core slot 15 and is moved. At this time, because each core slot 15 is bent in a circumferential direction, the drive shafts 24 and 26 rotate the rotary unit 10 so as to synchronize with move of each nozzle 23.

As each nozzle 23 passes by the armature core 12, the wire 14 is inserted into each core slot 15 as shown in FIG. 6(A). For example, if each nozzle 23 for winding the coil 18A shown in FIG. 2 is moved forth, the wire 14 is inserted into each core slot 15A.

Figure 6B:
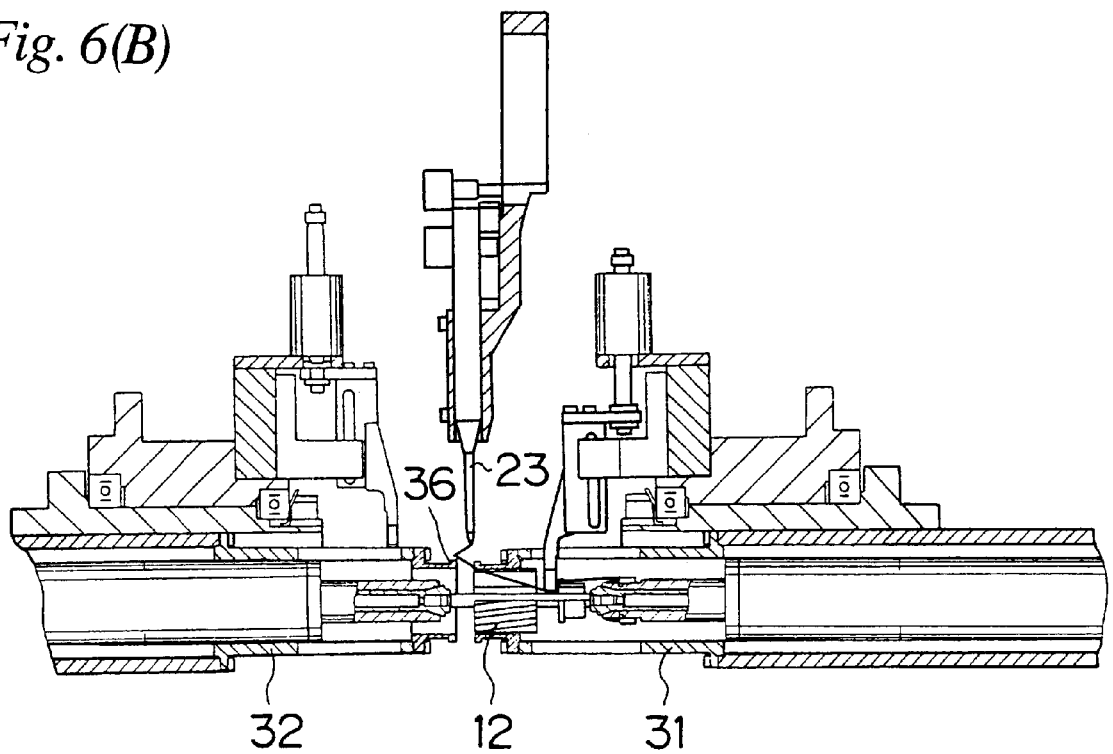
FIG. 6(B) is a cross-sectional view showing a condition where a drive sleeve moves forward.
Figure 7A:
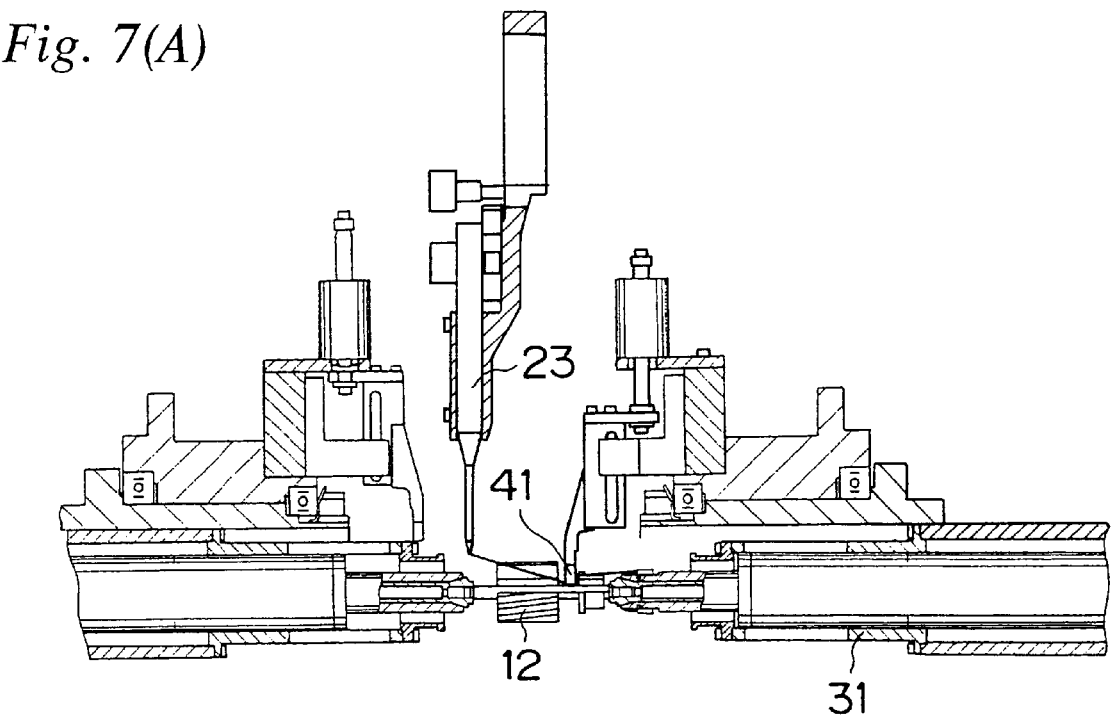
FIG. 7(A) is a cross-sectional view showing a condition where a wire hook moves forward.

Then, the press clamp 41 is moved backward outside a radius direction, and the drive sleeve 31 is further moved forward toward the armature core 12. Thereafter, as shown in FIG. 6(B), the clamp 41 is again moved forward and passes through the opening portion 31a formed in the drive sleeve 31 and thereby clamps the wire 14 again. In accordance with this operation, as illustrated in FIG. 7(A), the drive sleeve 31 is moved forward the armature core 12 and the shaping hook 36 of the shaping cylinder 34 is located closer to a side of armature core 12 than a side of each nozzle 23.

Figure 7B:
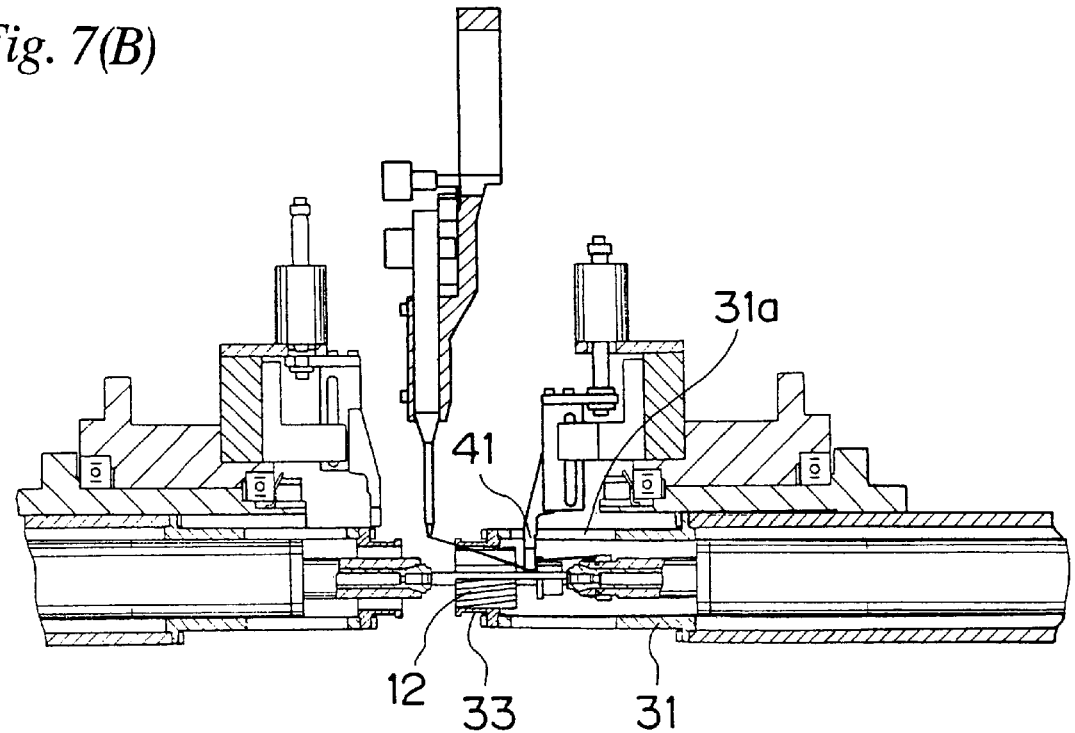
FIG. 7(B) is a cross-sectional view showing a condition where a coil end portion is formed.

Under this condition, since the nozzle supporting member 22 is rotated, each nozzle 23 is moved in a circumferential direction of the armature core 12 and the wire 14 hooks the shaping hook 36. Thereafter, since each nozzle 23 is moved backward, the wire 14 shown in FIG. 7(B) is released from the shaping hook 36 and thereby the coil end portion is formed.

Figure 8A:
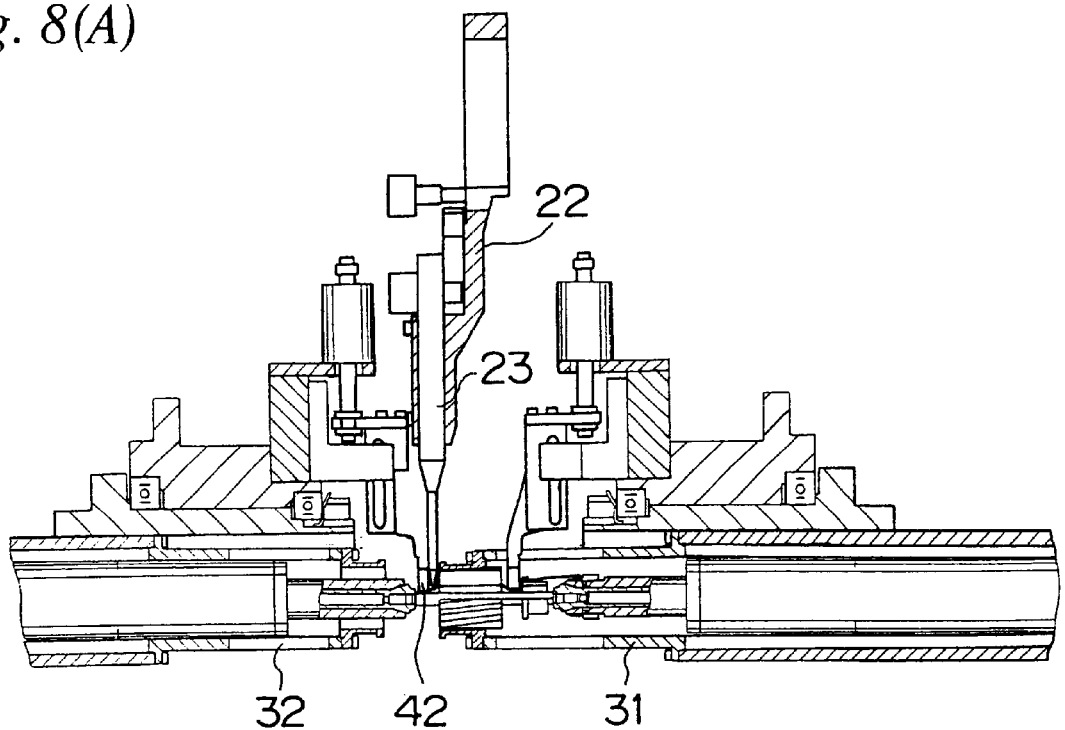
FIG. 8(A) is a cross-sectional view showing a condition where the nozzle presses the wire.

After the wire 14 is released from the shaping hook 36, as shown in FIG. 8(A), the drive sleeve 32 is moved backward. And, the nozzle supporting member 22 is rotated and each nozzle 32 is moved at a position of corresponding another slot core 15 in order to form a pair of coils 18. Thereafter, the wire 14 is pressed on the outer circumferential surface of the shaft 11 by moving forth each nozzle 23, and the coil end portion is clamped by moving forth the press clamp 42. Thus, for example, the nozzle 23 for winding the coil 18A shown in FIG. 2 is moved up to a location of the core slot 15B between the eighth and ninth core teeth 16 and thereby the coil end portion 18b1 of the coil 18A is formed.

Figure 8B:
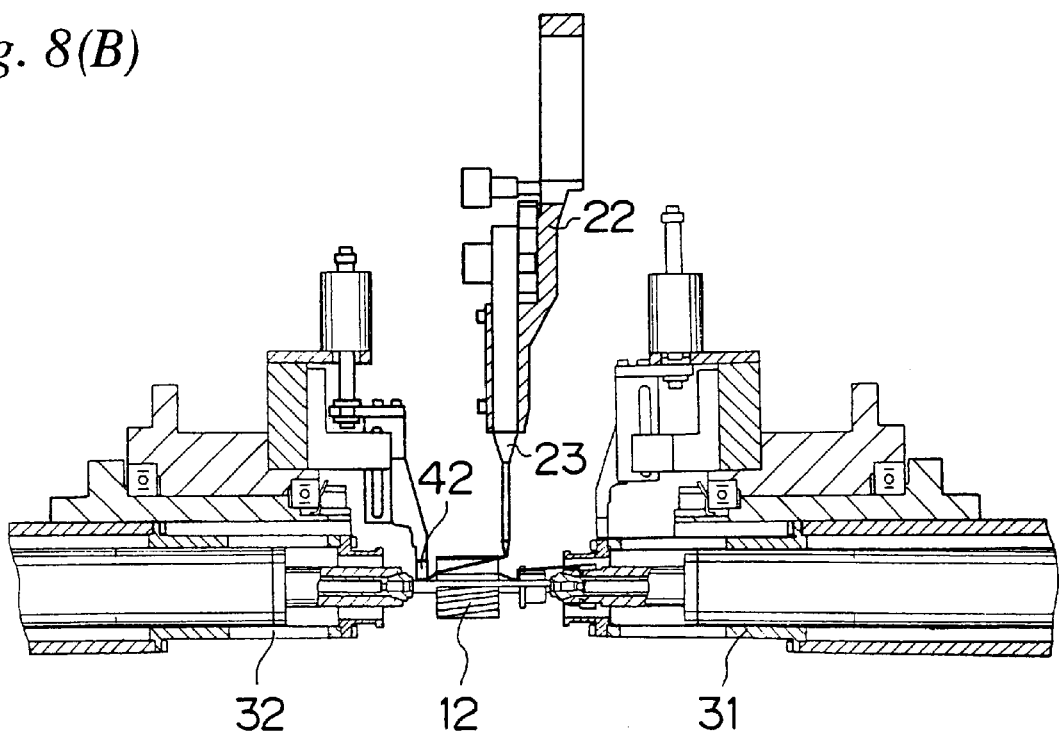
FIG. 8(B) is a cross-sectional view showing a condition where the nozzle moves backward to insert the wire into the core slot.
Figure 9A:
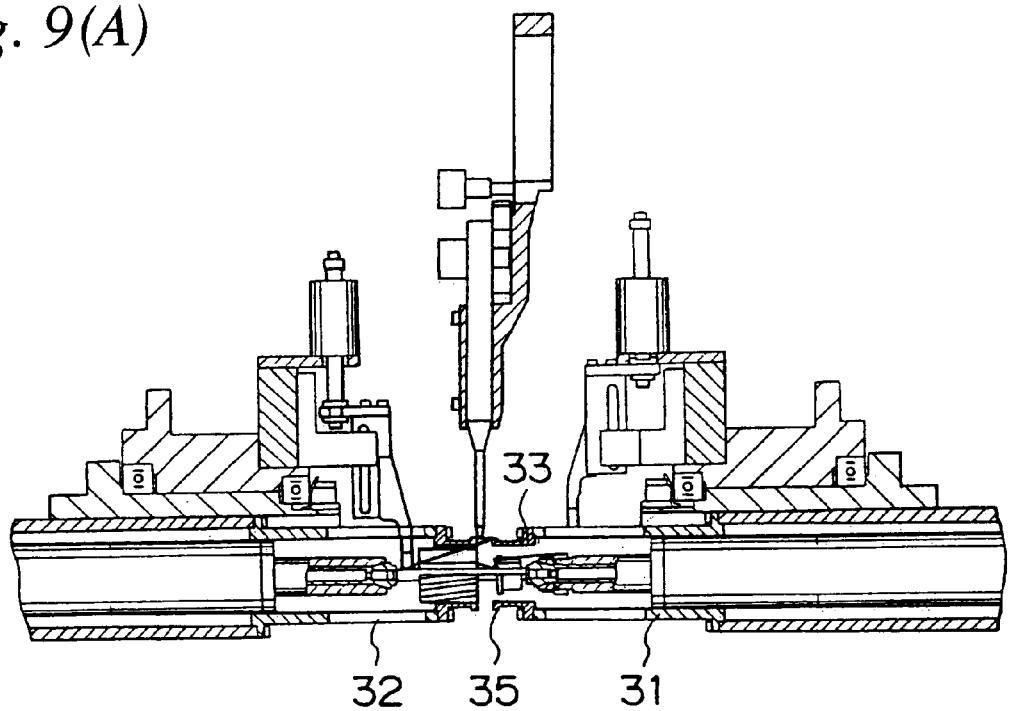
FIG. 9(A) is a cross-sectional view showing a condition where the wire is hooked by the wire hook.

Next, as shown in FIG. 8(B), after each nozzle 23 is moved backward, the press clamp 41 is moved backward and each nozzle 23 is moved backward in an axial direction. After the drive sleeve 32 is moved forth toward the armature 12, the press clamp 42 is moved forth through the opening portion 32a again. Accordingly, the wire 14 is clamped and the drive sleeve 31 is move forth toward the drive sleeve 32. Under this condition, the shaping hook 35 of the shaping cylinder 33 hooks the wire 14. A condition where the wire located in a side of the commutator is turned up is shown in FIG. 9(A).

Under this condition, when each nozzle 23 is moved backward, the wire is released from the shaping hook 35. After release, the nozzle supporting member 22 is rotated and rotates and moves each nozzle 23 up to a position of each core slot into which the wire is inserted while each nozzle 23 moves forth. By moving forth each nozzle 23 under this condition, the wire 14 is bent so as to be in contact with an outer circumferential surface of the shaft 11 and thereby the coil end portions located in a side of the among the coils 18 is formed.

Thus, by reciprocating the nozzle supporting member 22 once, the wire is inserted into two core slots 15 spaced only a predetermined pitch from each other and one winding among the coils 18 is formed.

Figure 9B:
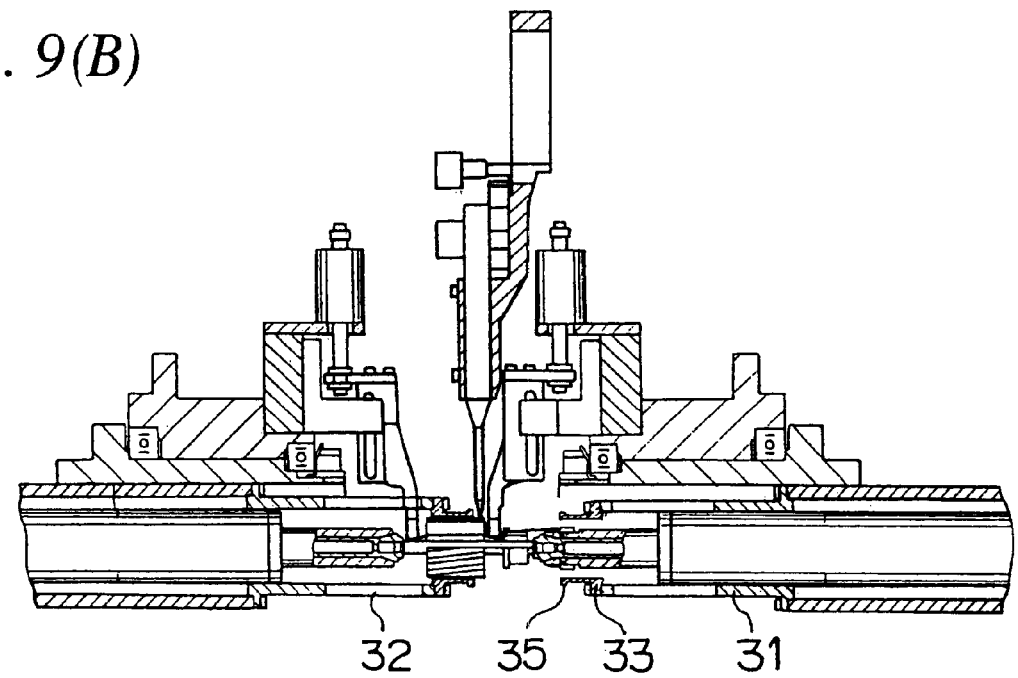
FIG. 9(B) is a cross-sectional view showing a condition where the coil end portion is formed in a side of the commutator.

After the first winding is formed, in order to form a second winding, each nozzle 23 is moved backward and then the press clamp 41 is moved forward to clamp the wire 14. This condition is shown in FIG. 9(B). Under this condition, when the nozzle supporting member 22 is moved forward again, the wire is again inserted into each core slot 15 into which the wire 14 has been inserted yet in a step executed in FIG. 6(B). For example, in the case of the coil 18A shown in FIG. 2, a first wire has entered the core slot 15A by the first winding, and a second wire of the coil 18A enters the core slot 15A. The wire composed of the coil 18B has already been inserted into this core slot 15A by moving backward each nozzle 23.

By repeating a winding step shown in FIGS. 5 to 9 more than twice, the coils 18 having a predetermined windings is formed in the armature. In the case of the armature shown in FIG. 2, twenty-one pairs of coils 18 are formed at the same time. The other end portion of each of the coils 18 is fixed to the predetermined segment 13a after the rotor unit 10 is removed from the winding machine. Moreover, both end portions of each of the coils 18 are jointed to the segment 13a by means of a means such as electrode-position or the like.

The winding machine shown in the drawing can execute such an operation that each nozzle 23 passes through the core slot 15 and inserts the wire into this, and thereafter presses the wire 14 which is moved forth toward the shaft 11, on the shaft 11. Thereby, as shown in FIG. 1(A), the coils 18 occupy a step portion between a bottom surface S1 of each core slot 15 and an outer surface S2 of the shaft 11, so that a coil terminal portion can become small in size. Therefore, the winding numbers of each of the core slots 15 can be increased. Particularly, in the case of the rotary unit 10 having a shaft with a small outer diameter, it is possible to use effectively a space of the step portion.

In the winding machine shown in the drawing, each coil end portion of a side opposite to the commutator 13 is formed by winding the wire around the shaping hook 35, and each coil end portion of a side of the commutator is formed by winding the wire around the shaping hook 36. Unless the coil end portions are shaping-wound, the shaping hook 35 and 36 is not used.

When each coil 18 is formed in the armature core 12 shown in FIG. 1(A), the winding step forms the coil end portions in both sides of the armature core 12. Particularly, a coil end portion formed by a second winding step is closer to an end portion of the armature core 12 than the coil end portion by the first winding step. Subsequently to this, as the winding step approaches from a third one to a last one, each coil end portion based on the corresponding winding step is formed to be close to the end portion of the armature core 12. Hence, in the case of manufacture of the armature core shown in FIG. 1(A), as the winding step approaches from the third one to the last one, each forward position of the shaping cylinders 33 and 34 for forming the coil end portions is different so as for each coil end portion to be close to the end portion of the armature core 12.

Thus, as shown in FIG. 1(A), the coil terminal portion composed of all the coil end portions has a dome-shaped end surface in an axial direction. Even if the winding numbers are increased, it is possible to avoid becoming an large size of the coil terminal portion and to restrain a projecting dimension of the coil terminal portion.

In the armature core 12 shown in FIG. 1(A), a projecting length between the end surface of the armature 12 and the coil end portion formed in the first winding step is L1. A projecting length between the end surface of the armature 12 and the coil end portion formed in a last winding step is Ln. As shown in FIG. 1(A), the projecting length of each coil end portion becomes gradually short from the coil end portion formed in the first winding step to the coil end portion formed in the last winding step. Portions located outside both end surfaces has the same structure as this.

The armature shown in FIG. 1(A), by using spaces between outsides of both end surfaces of the armature core and an outer surface of the shaft 11, can be provided with coil end portions in these spaces. Even if the winding number of coils wound in the core slots are increased, it is possible to restrain a projecting dimension of the coil terminal portion formed by the coil end portions.

In the case where the coils are formed in the armature core 12 shown in FIG. 1(B), as shown in the drawing, by repeating twice the winding step shown in FIGS. 5 to 9, twenty-one pairs of two winding coils, in each of which the coil end portions is formed, are simultaneously formed. With the two winding coils wound, each nozzle is moved forth and a straight portion of each coil end portion, which is close to the end portion of the armature core 12, is pressed toward the shaft 11. Thereby, a winding space of each coil end portion to be formed by the further continuous winding of the wire can be ensured.

After the wire 14 is drawn out from each nozzle 23 to insert the wire 14 into each core slot 15, each nozzle 23 is moved forward toward the shaft 11 and thereby each coil end portion is pressed on the shaft 11. However, by omitting this and pressing the coil end portion only by an operation of the press clamps 41 and 42, a winding space of the coil end portion to be formed by the further continuous winding may be ensured. Without adding pressure thereof to the wire during formation of the first winding but after the second winding to be finally shaping-wound is wound, pressure may be added to the wire only once.

The remaining third to fifth coil windings are executed by a direct-winding method, without moving forth each nozzle 23 to press the wire, and fixing each coil end portion by the press clamps 41 and 42, and forming each coil end portion by using the shaping hooks 35 and 36 of the shaping cylinders 33 and 34.

Accordingly, the wire 14 is inserted into the first core slot by moving forth each nozzle 23. Thereafter, each nozzle 23 is rotated up to a position of the second core slot. Then, each nozzle 23 is moved back and the wire 14 is inserted into the second core slot corresponding to the first core slot and thereby one coil winding is formed. In FIG. 1(B), the coil end portions of two coil windings formed by a shaping-winding method are denoted by the reference number 18M and the coil end portions of three coil windings formed by a direct-winding method are denoted by the reference number 18N.

Thus, as shown in FIG. 1(B), after the first to the last winding coils are formed, similarly to the case shown in FIG. 1(A), the rotor unit 10 is removed from the winding machine, and then the other end portion of each coil 18 is fixed to the predetermined segment 13a as in the rotor unit. And, both end portions of each coil 18 are jointed to the segment 13a by means of a means such as electro-deposition or the like.

In the case of manufacture of the armature shown in FIG. 1(B) by using the winding machine shown in the drawing, the coil end portions formed by the first and second winding coils are formed by a shaping-winding method using the shaping cylinders 33 and 34. It is possible to ensure a winding space for each coil end portion, such that a straight portion close to the end portions of the armature core 12 is pressed to the shaft 11. And, since the remaining coil end portions are formed not by a shaping-winding method but by a direct-winding method, so that it is possible to shorten time required for forming the coil windings.

In the armature shown in FIG. 1(B), the coil end portions of the coils formed by inserting the wire into the each core slot are formed by a shaping-winding method between the first winding coil and predetermined number-th of winding coils. The coil end portions of the remaining winding to the last winding coils are formed by a direct-winding method. And so, in comparison with the case of the winding coils formed only by a shaping-winding method, it is possible to decrease sharply time required for manufacturing armatures and to improve efficiency of the manufacture thereof. The shaping-winding method is firstly executed, and the coil end portions obtained by execution of the shaping-winding method are pressed to the shaft. Therefore, it is possible to ensure a winding space for each coil end portion formed by a direct-winding method and to miniaturize a size of the coil terminal portion formed by all the coil end portions even if the winding numbers are increased.

The present invention is not limited to the above-mentioned embodiment and, needless to say, can make various changes and modifications without departing from the gist thereof.

For example, the number of core slots formed on the armature 12 is twenty-one in the case shown in the drawings, but is not limited to this case. And, a pair of coils 18 enters the core slot 15 spaced per five-slot pitch, but this pitch number is not limited to the case shown in the drawings. Moreover, the number of coils 18 formed by winding the wire 14 around the armature 12 is not limited to the case shown in the drawings and may be any other numbers.

Industrial Applicability

According to the present invention, it is possible to increase efficiency for manufacturing armatures. In the case where coils are formed on an armature core by means of a shaping-winding method, it is possible to restrain a projecting dimension of each coil end portion even if the winding number of coils is increased. Since the coil end portions of the first winding to the predetermined number-th winding coils are formed by a shaping-winding method and the coil end portions of the predetermined number-th winding to the last winding coils are formed by a direct-winding method, in comparison with the case of formation of all the coil end portions by a shaping-winding method, it is possible to execute in a short time and efficiency manufacture of armatures.

What is claimed is:

1. A winding method of an armature winding a coil by drawing out a wire from a plurality of nozzles, on an armature core which is provided on a shaft and on which a plurality of core slots extend in an axial direction thereof and is radiately formed, said winding method comprising the steps of:

moving each of said nozzles from one end side of said armature core to the other end side, and inserting the wire into a first core slot, under the condition that each wire is pressed to said shaft by a press clamp;

moving each of said nozzles from the other end side of said armature back to the one end side, and inserting the wire into a second core slot different from said first core slot, under the condition that each wire is pressed to said shaft by a press clamp;

forming a coil end portion by hooking, around a shaping hook, a crossover portion which is formed in both sides of an end surface of said armature core and connects each wire existing in said first and second core slots and by bending the crossover portion by said nozzles;

making said nozzles close to said shaft, and thereby pressing said crossover portion on said shaft; and pressing said coil end portion to said shaft by said press clamp.

2. A winding method of an armature winding a coil by drawing out a wire from a plurality of nozzles, on an armature core which is provided on a shaft and on which a plurality of core slots extend in an axial direction thereof and is radiately formed, said winding method comprising the steps of:

moving each of said nozzles from one end side of said armature core to the other end side, and inserting the wire into a first core slot, under the condition that each wire is pressed to said shaft by a press clamp;

moving each of said nozzles from the other end side of said armature back to the one end side, and inserting the wire into a second core slot different from said first core slot, under the condition that each wire is pressed to said shaft by a press clamp;

forming a coil end portion by hooking, around a shaping hook, a crossover portion which is formed in both sides of an end surface of said armature core and connects each wire existing in said first and second core slots and by bending the crossover portion by said nozzles; and pressing said coil end portion to said shaft by said press clamp, wherein, in order to form a predetermined winding number of coils in said armature core, a plurality of coil end portions formed by repeating plural numbers each of said steps from a first time to a last time are closer to the end surface of said armature core as the number of times increases from the first time to the last time.

3. A winding method of an armature winding a coil by drawing out a wire from a plurality of nozzles, on an armature core which is provided on a shaft and on which a plurality of core slots extend in an axial direction thereof and is radiately formed, said winding method comprising the steps of:

moving each of said nozzles from one end side of said armature core to the other end side, and inserting the wire into a first core slot, under the condition that each wire is pressed to said shaft by a press clamp;

moving each of said nozzles from the other end side of said armature back to the one end side, and inserting the wire into a second core slot different from said first core slot, under the condition that each wire is pressed to said shaft by a press clamp;

forming a coil end portion by hooking, around a shaping hook, a crossover portion which is formed in both sides of an end surface of said armature core and connects each wire existing in said first and second core slots and by bending the crossover portion by said nozzles; and pressing said coil end portion to said shaft by said press clamp, wherein said coil end portion is formed during formation of a first to a predetermined number-th coils, and the wire is directly inserted into said first and second core slots without forming said coil end portion after said predetermined number-th coil is formed.

4. A winding method of an armature according to claim 3, further comprising a step of pressing, to the shaft, said coil end portion formed by forming said predetermined number-th coil.

5. A winding apparatus of an armature winding a coil by drawing out a wire from a plurality of nozzles, on an armature core which is provided on a shaft and on which a plurality of core slots extend in an axial direction thereof and is radiately formed, said winding apparatus comprising:

a first drive shaft provided with a first collet chuck located to have the same center as a rotary center axis of said shaft and holding one end portion of said shaft;

a second drive shaft provided with a second collet chuck located to have the same center as said first collet chuck and holding the other end portion of said shaft;

a nozzle supporting member on which said nozzles are provided movably toward said rotary center axis and which is capable of reciprocating relatively in a direction lying along said rotary center axis and rotating relatively around said rotary center axis as a rotary center;

a first coil end shaping means having a shaping hook which is provided reciprocatably outside said first collet chuck in a direction lying along said rotary center axis and forms a coil end portion in a side of one end surface of said armature;

a second coil end shaping means having a shaping hook which is provided reciprocatably outside said second collet chuck in a direction lying along said rotary center axis and forms a coil end portion in a side of the other end surface of said armature;

a first press clamp movably provided outside said first drive shaft in a radius direction relative to said rotary center axis and pressing, to said shaft, the coil end portion formed by said first coil end shaping means; and a second press clamp movably provided outside said second drive shaft in a radius direction relative to said rotary center axis and pressing, to said shaft, the coil end portion formed by said second coil end shaping means, wherein a crossover portion is pressed on said shaft by making said nozzles close to said shaft, said crossover portion connecting the wire inserted into a first core slot by moving each of said nozzles from one end side of said armature core to the other end side and the wire inserted into a second core slot different from said first core slot by moving each of said nozzles from the other end side of said armature back to one end side, and wherein the wires are connected by said press clamp during insertion of the wire into each of said core slots.

6. A winding apparatus of an armature according to claim 5, wherein, in order to form a predetermined winding number of coils on said armature core, a plurality of coil end portions formed by repeating plural numbers a reciprocation of said nozzles in a direction lying along said rotary center axis are closer to an end surface of said armature core as the forming number of the coil end potions increases from a first time to a last time.

* * * * *